US007578522B2

(12) United States Patent
Hanano et al.

(10) Patent No.: US 7,578,522 B2
(45) Date of Patent: Aug. 25, 2009

(54) GAS GENERATOR

(75) Inventors: Teppei Hanano, Tatsuno (JP); Takashi Okuyama, Tatsuno (JP)

(73) Assignee: Daicel Chemical Industries, Ltd., Osaka (JP)

( * ) Notice: Subject to any disclaimer, the term of this patent is extended or adjusted under 35 U.S.C. 154(b) by 330 days.

(21) Appl. No.: 11/511,413

(22) Filed: Aug. 29, 2006

(65) Prior Publication Data
US 2007/0046005 A1 Mar. 1, 2007

Related U.S. Application Data

(60) Provisional application No. 60/712,848, filed on Sep. 1, 2005.

(30) Foreign Application Priority Data
Aug. 30, 2005 (JP) ............... 2005-248593

(51) Int. Cl.
*B60R 21/16* (2006.01)
*B60R 21/217* (2006.01)
*B60R 21/26* (2006.01)
*B60R 21/264* (2006.01)

(52) U.S. Cl. ............... 280/740; 280/736; 280/741; 280/742; 102/531

(58) Field of Classification Search ................ 280/736, 280/740, 741, 742, 743.1; 102/530, 531; *B60R 21/16, B60R 21/217, 21/26, 21/264*
See application file for complete search history.

(56) References Cited

U.S. PATENT DOCUMENTS 5,306,041 A * 4/1994 Ogawa et al. ............ 280/741
5,387,007 A * 2/1995 Ogawa et al. ............ 280/740
5,466,420 A 11/1995 Parker et al.

(Continued)

FOREIGN PATENT DOCUMENTS

JP 5-178157 A 7/1993

(Continued)

*Primary Examiner*—Ruth Ilan
*Assistant Examiner*—Barry Gooden, Jr.
(74) *Attorney, Agent, or Firm*—Birch, Stewart, Kolasch & Birch, LLP

(57) ABSTRACT

The present invention provides a gas generator including a housing formed by a closure shell and a diffuser shell having a gas discharge port,
 a combustion chamber provided inside the housing and charged with a gas generating agent,
 an ignition device to ignite and burn the gas generating agent inside the combustion chamber,
 a cylindrical filter disposed to face the gas discharge port and having an annular upper surface press-contacting a ceiling surface of the housing,
 a retainer disposed inside the combustion chamber to support the cylindrical filter,
 the retainer being substantially a cylinder, having a larger diameter portion and a smaller diameter portion, that is provided with a vent hole, as well as an annular surface portion provided between the larger diameter portion and the smaller diameter portion,
 an outer peripheral surface of the larger diameter portion abutting against an inner wall surface of the housing before activation and press-contacting the inner wall surface of the housing in activation, the annular surface portion press-contacting an annular lower surface of the cylindrical filter and an outer peripheral surface of the smaller diameter portion abutting against an inner peripheral surface of the cylindrical filter,
 a lower end portion of the larger diameter portion press-contacting the inner peripheral surface of the housing.

2 Claims, 1 Drawing Sheet

U.S. PATENT DOCUMENTS

| | | | | |
|---|---|---|---|---|
| 5,531,474 | A | * | 7/1996 | Osborne et al. ............. 280/740 |
| 5,556,132 | A | * | 9/1996 | Sampson .................... 280/471 |
| 5,582,427 | A | * | 12/1996 | Rink et al. ................. 280/740 |
| 6,032,979 | A | * | 3/2000 | Mossi et al. ................ 280/741 |
| 6,189,927 | B1 | * | 2/2001 | Mossi et al. ................ 280/741 |
| 6,199,906 | B1 | * | 3/2001 | Trevillyan et al. ........... 280/741 |
| 6,543,805 | B2 | | 4/2003 | McFarland et al. |
| 6,886,856 | B2 | * | 5/2005 | Canterberry et al. ........ 280/741 |
| 7,044,502 | B2 | * | 5/2006 | Trevillyan et al. ........... 280/741 |
| 7,055,855 | B2 | * | 6/2006 | Nakashima et al. ......... 280/736 |
| 2003/0132623 | A1 | * | 7/2003 | Iwai et al. .................. 280/736 |
| 2004/0061319 | A1 | * | 4/2004 | Saso et al. .................. 280/741 |
| 2004/0195813 | A1 | * | 10/2004 | Canterberry et al. ........ 280/741 |
| 2004/0203373 | A1 | | 10/2004 | Ogino et al. |
| 2005/0184498 | A1 | * | 8/2005 | Trevillyan et al. ........... 280/741 |
| 2005/0200107 | A1 | * | 9/2005 | Matsuda et al. ............. 280/741 |
| 2006/0001246 | A1 | * | 1/2006 | Gotoh et al. ................ 280/736 |

FOREIGN PATENT DOCUMENTS

| | | |
|---|---|---|
| JP | 7-31518 U | 6/1995 |
| JP | 10-81190 A | 3/1998 |
| JP | 2006076558 A * | 3/2006 |

* cited by examiner

GAS GENERATOR

This nonprovisional application claims priority under 35 U.S.C. §119(a) on Patent Application No. 2005-248593 filed in Japan on 30 Aug. 2005 and 35 U.S.C. §119(e) on U.S. Provisional application No. 60/712,848 filed on 1 Sep. 2005, which are incorporated by reference.

BACKGROUND OF THE INVENTION

1. Field of the Invention

The present invention relates to a gas generator for an air bag system.

2. Description of Related Art

A filter serving as a constitutional component of a gas generator used in an air bag system of an automobile has a function for cooling high-temperature combustion gas and a function for filtering solid matter contained in the combustion gas. When the gas generator is activated, the high-temperature gas that is generated upon combustion of a gas generating agent passes through the filter to be cooled and filtered, and then flows into an air bag.

However, when a short pass occurs such that the combustion gas flows into the air bag without passing through the filter, even though the filtering and cooling functions of the filter are sufficiently exhibited, a passenger may be injured by the high-temperature gas and combustion residue that flows into the air bag.

To prevent this type of short pass, the filter preferably covers as wide a surface area of the gas generator interior as possible, but as a result, the weight of the filter increases so that it becomes impossible to respond to demands for reductions in the weight of the gas generator.

JP-U No. 7-31518, JP-A No. 5-178157, and JP-A No. 10-81190 may be cited as prior art relating to the present invention.

SUMMARY OF THE INVENTION

The invention provides a gas generator including:

a housing formed by a closure shell and a diffuser shell having a gas discharge port, a combustion chamber provided inside the housing and charged with a gas generating agent, an ignition device to ignite and burn the gas generating agent inside the combustion chamber, a cylindrical filter disposed to face the gas discharge port and having an annular upper surface press-contacting a ceiling surface of the housing, a retainer disposed inside the combustion chamber to support the cylindrical filter and the retainer being substantially a cylinder, having a larger diameter portion and a smaller diameter portion, the smaller being provided with a vent hole, and an annular surface portion provided between the larger diameter portion and the smaller diameter portion, an outer peripheral surface of the larger diameter portion abutting against an inner wall surface of the housing before activation and press-contacting the inner wall surface of the housing in activation, the annular surface portion press-contacting an annular lower surface of the cylindrical filter, an outer peripheral surface of the smaller diameter portion abutting against an inner peripheral surface of the cylindrical filter, a lower end portion of the larger diameter portion press-contacting the inner peripheral surface of the housing.

The invention provides, in other words, a gas generator including:

a housing constituted by a closure shell and a diffuser shell having a gas discharge port;

a combustion chamber provided within the housing and charged with a gas generating agent;

an ignition device for igniting and burning the gas generating agent in the combustion chamber; and a cylindrical filter disposed opposite the gas discharge port, an annular upper surface of which is pressed against a ceiling surface of the housing, wherein a retainer for supporting the cylindrical filter is disposed in the combustion chamber, the retainer takes a substantially cylindrical shape including a larger diameter portion, a smaller diameter portion having a vent hole, and an annular planar portion provided between the larger diameter portion and the smaller diameter portion, an outer peripheral surface of the larger diameter portion contacts an inner wall surface of the housing prior to an operation and is pressed against the inner wall surface of the housing during the operation, the annular planar portion is pressed against an annular lower surface of the cylindrical filter, and an outer peripheral surface of the smaller diameter portion contacts an inner peripheral surface of the cylindrical filter, and a lower end portion of the larger diameter portion is pressed against the inner wall surface of the housing.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
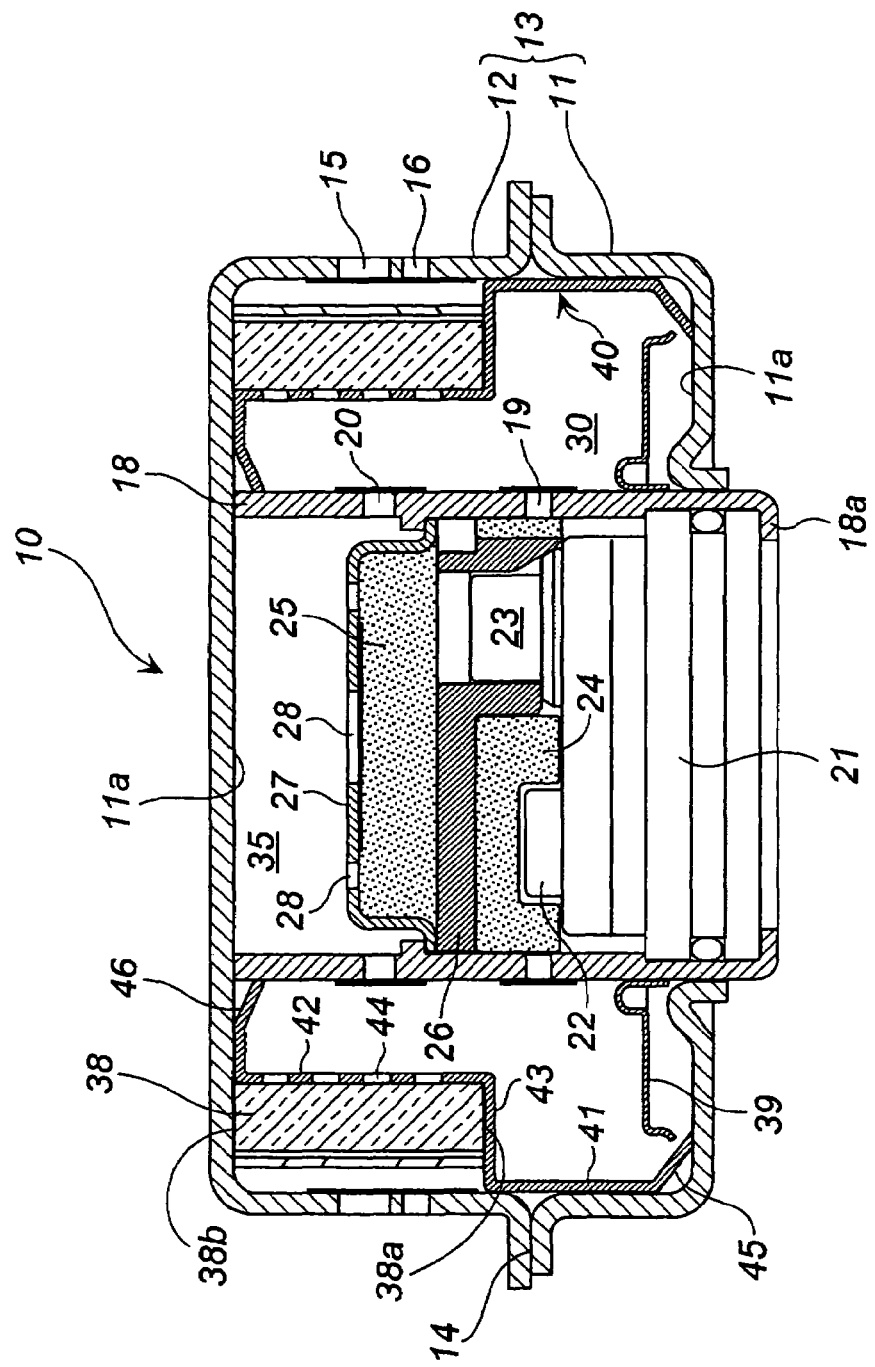
FIG. 1 shows a vertical sectional view of a gas generator of the present invention.

In the invention disclosed in JP-U No. 7-31518, a container is partially deformed and a filter is fixed to the deformed part by caulking, and hence the structure of the invention is complicated.

In the invention disclosed in JP-A No. 5-178157, a plurality of filters extending from the bottom surface to the ceiling surface of a housing are fixed using a diffuser ring, and hence a sufficient reduction in weight cannot be achieved.

In the invention disclosed in JP-A No. 10-81190, graphite sealing members 10a, 10b are disposed respectively between an upper surface of a cooling/filtering member 7 and a top cover, and between a lower surface of the cooling/filtering member 7 and a bottom cover 2a. Further, annular first and second bypass-preventing members 15 and 16 having an L-shaped cross section are disposed in contact with the inner surface of the cooling/filtering member 7 at the top and bottom end portions thereof, and also abutting against the inner surface of the top cover 1a and bottom cover 2a. A short pass is prevented by these combinations, but the number of components is large, and hence the assembly process is complicated.

The present invention provides a gas generator which can prevent the occurrence of a short pass through a combination of a filter and a retainer having a specific shape, in which the filter can be reduced in size and weight.

One, two, or more combustion chambers maybe provided. When two or more combustion chambers are provided, an appropriate partitioning member is disposed in the housing. A well-known gas generating agent may be used, and there are no particular limitations on the shape, material, composition, and so on thereof. A well-known electric igniter alone, or a combination of a well-known electric igniter and a well-known transfer charge, may be used as the ignition device. As for the cylindrical filter, a well-known filter formed by compression-molding laminated wire mesh or a well-known filter formed-by winding metal wire around a core material may be used.

The term "press-contacting" in the retainer refers to the state of the retainer pushing against the inner peripheral surface of the housing or the cylindrical filter. It may mean a gas sealing contact.

The term "abutting against" in the retainer refers to the state of the retainer contacting, but not pushing against, the inner peripheral surface of the housing or the cylindrical filter. There may be a little clearance therebetween. The upper end portion of the smaller diameter portion of the retainer abuts against the ceiling surface of the housing (diffuser shell ceiling surface)

When the gas generating agent in the combustion chamber burns to generate gas by activation of the ignition means, the entire retainer is pressed outward by the increase in internal pressure. As a result, an inner wall surface of the closure shell is pressed by the outer peripheral surface of the larger diameter portion, the inner peripheral surface of the cylindrical filter is pressed by the outer peripheral surface of the smaller diameter portion, and the bottom surface of the closure shell is pressed by the lower end portion of the larger diameter portion. At this time, the diffuser shell ceiling surface is also pressed by the upper end portion of the smaller diameter portion, but since the upper end surface of the cylindrical filter already press-contacts the diffuser shell ceiling surface, there is no need for the upper end portion of the smaller diameter portion to press-contact the diffuser shell ceiling surface.

Hence, the gas generated in the combustion chamber is supplied to the cylindrical filter reliably through the vent hole in the smaller diameter portion (in certain cases, a part of the gas passes between the upper end portion of the smaller diameter portion and the diffuser shell ceiling surface), and is filtered and cooled by the cylindrical filter. The filtered and cooled gas is then discharged through the gas discharge port. As a result, a short pass, in which the gas is discharged through the gas discharge port without passing through the cylindrical filter, does not occur.

As a result of the actions of the retainer formed in this specific shape, a short pass of the gas generated in the combustion chamber can be prevented, and the gas can be led to the cylindrical filter. Hence, the cylindrical filter can be reduced in size and weight while maintaining the filtering and cooling functions of the filter.

The retainer is preferably made from aluminum, stainless steel, iron, or the like for strength and elasticity. The thickness of the retainer is adjusted in consideration of the mass of the cylindrical filter to obtain a strength which can support the cylindrical filter throughout the useful life of the vehicle.

The present invention provides the gas generator, wherein the lower end portion of the larger diameter portion of the retainer has an inward-facing flange portion, an upper end portion of the smaller diameter portion has an inward-facing flange portion, and the flange portion of the larger diameter portion press-contacts a bottom surface of the closure shell.

By providing the flange portions in this manner, in an operation of the gas generator, the tightness with which the lower end portion of the larger diameter portion is pressed against the closure shell bottom surface increases, and the contact area between the upper end portion of the smaller diameter portion and the ceiling surface of the diffuser shell increases, making the retainer less likely to shift.

The present invention provides the gas generator, wherein a height of the cylindrical filter is lower than a height of the diffuser shell.

By reducing the size and weight of the cylindrical filter, the weight of the entire gas generator can be reduced.

According to the gas generator of the present invention, by employing a retainer having a specific shape, the filter can be reduced in size and weight while maintaining cooling, filtering, and short pass preventing functions, and as a result, the weight of the entire gas generator can be reduced. Moreover, the number of components is small, and therefore the manufacturing process can be simplified.

EMBODIMENTS OF THE INVENTION

An embodiment of the present invention will be described with reference to FIG. 1. FIG. 1 is a vertical sectional view of a gas generator 10 of the present invention.

An outer shell of the gas generator 10 is formed by a housing 13 formed by a closure shell 11 and a diffuser shell 12. A plurality of gas discharge ports 15, 16 having different diameters and sealed from the inside by aluminum tape or the like are provided in the diffuser shell 12.

An inner cylinder 18 is disposed in a central portion of the housing 13. A peripheral edge of an opening portion on the upper end of the inner cylinder 18 press-contacts a ceiling surface 12a of the diffuser shell 12. A lower end portion side of the inner cylinder 18 is inserted into a hole provided in a central portion of the closure shell 11.

A first igniter 22 and a second igniter 23, which are fixed to a single metallic collar 21, are fitted into an opening at the lower end portion side of the inner cylinder 18. The metallic collar 21 is fixed by caulking an peripheral edge 18a of the opening in the inner cylinder 18.

A first transfer charge 24 charged into an aluminum cup is disposed in an ignition portion of the first igniter 22, and a second transfer charge 25 is disposed in an ignition portion of the second igniter 23. A partition wall separates between the first transfer charge 24 and the second transfer charge 25 and between the second igniter 23 and a partition wall 26. Hence, when the first igniter 22 is activated, the second igniter 23 and second transfer charge 25 are not affected. The second transfer charge 25 is charged into a space surrounded by the partition wall 26 and a retaining member 27 having a plurality of flame transmission holes 28.

A cylindrical space surrounded by the housing 11 and inner cylinder 18 serves as a first combustion chamber 30, and a first gas generating agent, not shown in the drawing, is charged into the interior thereof. The volume of the first combustion chamber 30 is adjusted in accordance with the charged amount of the first gas generating agent by a volume adjusting retainer 39.

The first igniter 22 and first combustion chamber 30 communicate via a first through hole 19 provided in the inner cylinder 18. The first through hole 19 is sealed from the inside by an aluminum tape or the like.

A space surrounded by the inner cylinder 18 and retaining member 27 serves as a second combustion chamber 35, and a second gas generating agent, not shown in the drawing, is charged into the interior thereof. If necessary, a well-known automatic ignition material including nitrocellulose or the like may be disposed in the second combustion chamber 35.

The second combustion chamber 35 and first combustion chamber 30 communicate via a second through hole 20 provided in the inner cylinder 18. The second through hole 20 is sealed from the inside by aluminum tape or the like.

A cylindrical filter 38 is disposed in the first combustion chamber 30. The height of the cylindrical filter 38 is lower than the height of the diffuser shell 12, and a filter formed by wire windings, a knit mesh filter, or a combination of a filter formed by wire windings and a wire mesh filter is used. The material of the filter wire may be iron, cast iron, soft iron, stainless steel, a nickel alloy, a copper alloy, and so on.

The cylindrical filter 38 is supported by a retainer 40. The retainer 40 is made from aluminum, stainless steel, iron, or another material, is strong enough to support the cylindrical filter 38, and also possesses elasticity.

The retainer 40 includes a larger diameter portion 41, a smaller diameter portion 42 having a smaller diameter than the larger diameter portion 41, and an annular plane surface portion 43 between the larger diameter portion 41 and smaller diameter portion 42. A plurality of vent holes 44 are provided in the smaller diameter portion 42.

An outer peripheral surface of the larger diameter portion 41 abuts against an inner peripheral surface of the closure shell 11 to cover a joint part 14 between the closure shell 11 and diffuser shell 12 from the inside.

The annular surface portion 43 has a width which is at least equal to or greater than the thickness of the cylindrical filter 38, and press-contacts an annular lower surface 38a of the cylindrical filter 38. An annular upper surface 38b of the cylindrical filter 38 press-contacts the diffuser shell ceiling surface 12a.

The smaller diameter portion 42 has an approximately equal height to the height of the cylindrical filter 38, and an outer peripheral surface thereof abuts against the inner peripheral surface of the cylindrical filter 38.

A lower end portion of the larger diameter portion 41 has an inward-facing flange portion 45, and the flange portion 45 press-contacts a closure shell bottom surface 11a. The flange portion 45 may take the form shown in the drawing or a form which matches the interior form of the closure shell 11.

An upper end portion of the smaller diameter portion 42 has an inward-facing flange portion 46. The flange portion 46 abuts against the diffuser shell ceiling surface 12a, and a tip end portion thereof abuts against an outer peripheral wall of the inner cylinder 18. Since the flange portion 46 abuts against both the ceiling surface 12a of the diffuser shell and the outer peripheral wall of the inner cylinder 18 in this manner, the retainer 40 is less likely to shift.

By adjusting the overall height of the retainer 40, the retainer 40 is pressed and sandwiched from above and below by the closure shell 11 and diffuser shell 12, and hence the retainer 40 is fixed and prevented from shifting.

Furthermore, the cylindrical filter 38 is pressed and sandwiched from above and below by the annular planar portion 43 of the retainer 40 and the ceiling surface 12a of the diffuser shell, and hence the cylindrical filter 38 is supported, fixed, and prevented from shifting.

Next, an operation of the gas generator 10 when incorporated into an air bag system of an automobile will be described. Note that in the following, a case in which the first igniter 22 and second igniter 23 are activated at a slight time difference will be described.

When the automobile receives an impact upon collision, an activation signal is received from a control unit. As a result, the first igniter 22 is activated to ignite such that the first transfer charge 24 is ignited and burnt, thereby generating a flame and so on. The flame and so on flow through the first through hole 19 into the first combustion chamber 30, causing the first gas generating agent to ignite and burn such that gas is generated.

The internal pressure of the first combustion chamber 30 is raised by the generated gas such that pressure is applied to the retainer. 40. As a result, the bottom surface 11a of the closure shell is pressed by the flange portion 45, the inner peripheral wall of the closure shell 11, the joint portion 14, and a part of the inner peripheral wall of the diffuser shell 12 are pressed by the larger diameter portion 41, and the ceiling surface 12a of the diffuser shell is pressed by the flange portion 46. Moreover, the cylindrical filter 38 is pressed by the annular planar portion 43 and smaller diameter portion 42, and as a result, the tightness with which the annular upper surface 38b of the cylindrical filter 38 is pressed against the diffuser shell ceiling surface 12a increases.

Hence, all of the gas generated in the first combustion chamber 30 is supplied to the cylindrical filter 38 through the vent holes 44 provided in the smaller diameter portion 42, and a short pass does not occur. The gas is filtered and cooled by the cylindrical filter 38, ruptures the aluminum tape or the like, and is discharged through the gas discharge ports 15, 16 to inflate the air bag.

The second igniter 23 is activated to ignite at a slight delay such that the second transfer charge 25 is ignited and burned, thereby generating a flame and so on. The flame and so on flow through the flame transmission hole 28 into the second combustion chamber 35, causing the second gas generating agent to ignite and burn such that gas is generated.

The gas generated in the second combustion chamber 35 flows into the first combustion chamber 30 through the second through hole 20 and raises the internal pressure of the first combustion chamber 30. As a result, the retainer 40 exhibits the function for preventing the short passing, and the gas is supplied to the cylindrical filter 38 through the vent holes 44 provided in the smaller diameter portion 42. The gas is filtered and cooled by the cylindrical filter 38 and then discharged through the gas discharge ports 15, 16 to inflate the air bag further.

By forming the retainer 40 in the specific shape described above and using the internal pressure of the first combustion chamber 30, short pass can be prevented reliably, and the cylindrical filter 38 can be reduced in size, while maintaining the filtering and cooling functions of the cylindrical filter 38.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising:
   a housing formed by a closure shell and a diffuser shell having a gas discharge port,
   a combustion chamber provided inside the housing and charged with a gas generating agent,
   an ignition device to ignite and burn the gas generating agent inside the combustion chamber,
   a cylindrical filter disposed to face the gas discharge port and having an annular upper surface press-contacting a ceiling surface of the housing,
   a retainer disposed inside the combustion chamber to support the cylindrical filter and
   the retainer being substantially a cylinder, having a larger diameter portion and a smaller diameter portion, that is provided with a vent hole, and an annular surface portion provided between the larger diameter portion and the smaller diameter portion, an outer peripheral surface of the larger diameter portion abutting against an inner wall surface of the housing before activation and press-contacting the inner wall surface of the housing in activation, the annular surface portion press-contacting an annular lower surface of the cylindrical filter, an outer peripheral surface of the smaller diameter portion abutting against an inner peripheral surface of the cylindrical filter, a lower end portion of the larger diameter portion press-contacting the inner peripheral surface of the housing, a lower end portion of the larger diameter portion having an inward-facing flange portion, an upper end portion of the smaller diameter portion having an inward-facing flange portion, and the flange portion of the larger diameter portion press-contacting a bottom surface of the closure shell.

2. The gas generator according to claim 1, wherein a height of the cylindrical filter is lower than a height of the diffuser shell.

M

* * * * *